United States Patent
Shen (10) Patent No.: US 9,876,729 B1
(45) Date of Patent: Jan. 23, 2018

(54) METHOD AND SYSTEM FOR EFFICIENT DATA STREAMING IN AN EMULATION SYSTEM

(71) Applicant: CADENCE DESIGN SYSTEMS, INC., San Jose, CA (US)

(72) Inventor: Kun-Hsu K. Shen, Saratoga, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 302 days.

(21) Appl. No.: 14/748,881

(22) Filed: Jun. 24, 2015

(51) Int. Cl.
| | |
|---|---|
| *G06F 15/173* | (2006.01) |
| *H04L 12/863* | (2013.01) |
| *H04L 29/08* | (2006.01) |
| *H04L 29/06* | (2006.01) |

(52) U.S. Cl.
CPC .......... *H04L 47/622* (2013.01); *H04L 65/80* (2013.01); *H04L 67/10* (2013.01)

(58) Field of Classification Search
CPC .... G06F 11/261; G06F 15/78; G06F 15/7825; G06F 9/3877; G06F 9/3885; H04L 41/145; H04L 43/50; H04N 19/42; H04N 19/44; H04W 24/06; H04W 28/06; H04W 40/00; H04W 4/003; H04W 80/00; H04W 84/00

See application file for complete search history.

(56) References Cited

U.S. PATENT DOCUMENTS

| | | | | |
|---|---|---|---|---|
| 7,445,551 | B1* | 11/2008 | Okada ..................... | A63F 13/00 463/43 |
| 8,150,675 | B1* | 4/2012 | Ortmanns ............. | H04W 4/003 703/23 |
| 2008/0216073 | A1* | 9/2008 | Yates .................. | G06F 9/30174 718/100 |
| 2011/0258444 | A1* | 10/2011 | Chayat ................... | H04L 63/06 713/168 |
| 2012/0041745 | A1* | 2/2012 | Spilman ................ | G06F 11/261 703/13 |

* cited by examiner

*Primary Examiner* — Benjamin M Thieu
(74) *Attorney, Agent, or Firm* — Eric L. Sophir; Dentons US LLP (57) ABSTRACT

An emulation system for efficient data streaming is provided. The emulation system comprises a first device configured to product machine readable binary data, and a second device configured to receive the data. The emulation system further comprises a centralized first-in first-out (FIFO) memory unit. The centralized FIFO memory unit interfaces between the first device and the second device. The centralized FIFO memory unit is configured to receive the data from the first device, and transmit to the second device on receiving a transfer request from the first device or the second device.

19 Claims, 5 Drawing Sheets

METHOD AND SYSTEM FOR EFFICIENT DATA STREAMING IN AN EMULATION SYSTEM

TECHNICAL FIELD

This application relates generally to emulation systems, and more specifically relates to methods and systems for efficient streaming of data between components of the emulation system.

BACKGROUND

Sophisticated System on Chip (SoC) designs are rapidly evolving. The SoC designs being developed today have millions and millions of gates. The complexity of the designs combined with the use of devices using the SoC designs in industrial products of very high importance has made design verification an essential element in the semiconductor development cycle. Thus, prior to manufacture, the hardware designers frequently employ simulators and/or emulators to verify the functional behavior of the electronic devices and systems fabricated in accordance with their designs. One type of verification system for a hardware device under test (DUT) is a transaction-based acceleration verification process that generally provides an effective way to increase verification productivity, speed up time-to-market, and deliver greater confidence in the final SoC product. It provides a processor based simulation acceleration/emulation system, which is in communication with a workstation that sends data to and from the DUT. Such data can include digital test vectors or real signals from a logic system in which the DUT is intended for.

Figure 1:
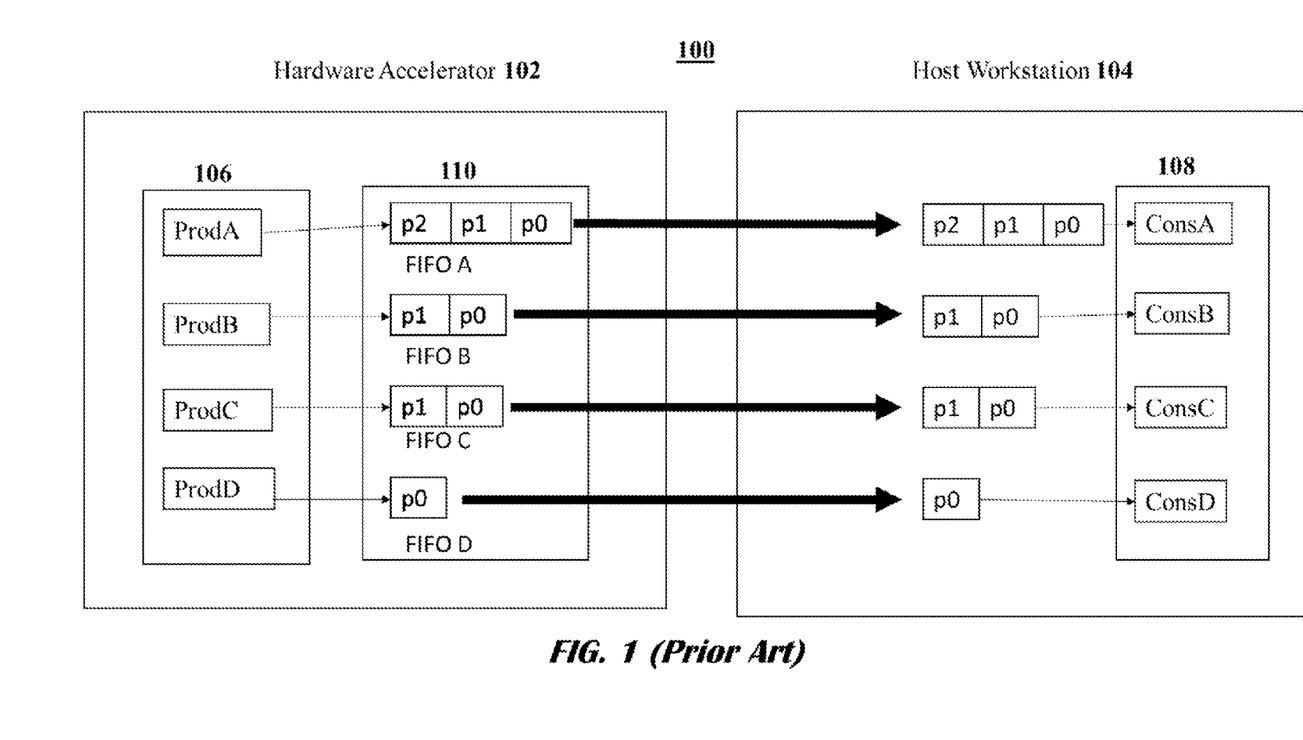
FIG. 1 is a block diagram depicting prior art method of streaming of data in an emulation system.

Various mechanisms/models have been employed in the art in order to transfer data comprising channel packets between the components of the emulation system. FIG. 1 depicts a conventional models to stream data between components of an emulation system 100. As illustrated, there is a hardware accelerator 102 and a host workstation 104. The hardware accelerator 102 comprises one or more producers 106. The one or more producers 106 are configured to produce one or more channel packets. The host workstation 104 comprises one or more consumers 108. The one or more consumers 108 are configured to receive the one or more channel packets produced by the one or more producers 106. In order to stream the one or more channel packets, from the one or more producers 106 to the one or more consumers 108, a dedicated accelerator memory 110 is allocated for each of one or more channels through which the one or more channel packets are routed. Each dedicated memory 110 is configured to handle its corresponding channel traffic. Thus, when a synchronization is requested by the one or more channels, then their corresponding memory 110 is uploaded separately by the corresponding one or more channel packets. Because each memory 110 read requires a PC latency, therefore this model requires multiple PC latencies as the multiple memories 110 are accessed/read separately. Due to the presence of multiple PC latencies, the speed of the operation becomes very slow.

Therefore, there is a need for methods and systems that addresses the above mentioned drawbacks of the conventional technique employed for data streaming in the emulation system, and thereby able to achieve optimal performance and higher speed for streaming of the data between the hardware accelerator and the host workstation in the emulation system.

SUMMARY

Methods and systems disclosed herein attempt to address the above issues and may provide a number of other benefits as well. Methods and systems of an emulation system described herein provide an efficient data streaming of multiple output channels using hardware accelerators. In an embodiment, the multiple channel transactions are routed through a centralized memory which thereby improves the performance of data streaming since only one PC latency is required for multiple output channels at the same time.

In one embodiment, an emulation system comprises a first device comprising a processor executing one or more emulation modules configured to produce one or more channel packets comprising machine readable binary data; and a centralized first-in first-out (FIFO) memory unit communicatively coupled to the first device and a second device, the centralized FIFO comprising non-transitory machine-readable storage media configured to sequentially store the one or more channel packets according to an ordering the one or more packets are received from the first device, and a processor configured to sequentially transmit the one or more channel packets to the second device upon receiving a transfer request from the first device or the second device.

In another embodiment, a processor-implemented method comprises receiving, by a processor of an emulation system, one or more channel packets from a first device of the emulation system, the first device executing one or more emulation modules configured to generate the one or more channel packets, the one or more channel packets comprising machine-readable binary data; sequentially storing, by the processor, the one or more channel packets to a centralized first-in first-out (FIFO) memory unit comprising non-transitory machine-readable storage media configured to store the one or more channel packets; and sequentially transmitting, by the processor, the one or more channel packets from the centralized FIFO memory unit to a second device, upon receiving a transfer request from the first device or the second device.

It is to be understood that both the foregoing general description and the following detailed description are exemplary and explanatory and are intended to provide further explanation of the invention as claimed.

BRIEF DESCRIPTION OF THE DRAWINGS

The accompanying drawings constitute a part of this specification and illustrate an embodiment of the invention and together with the specification, explain the invention.

DETAILED DESCRIPTION

The present disclosure is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Reference will now be made to the illustrative embodiments illustrated in the drawings, and specific language will be used here to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

Figure 2A:
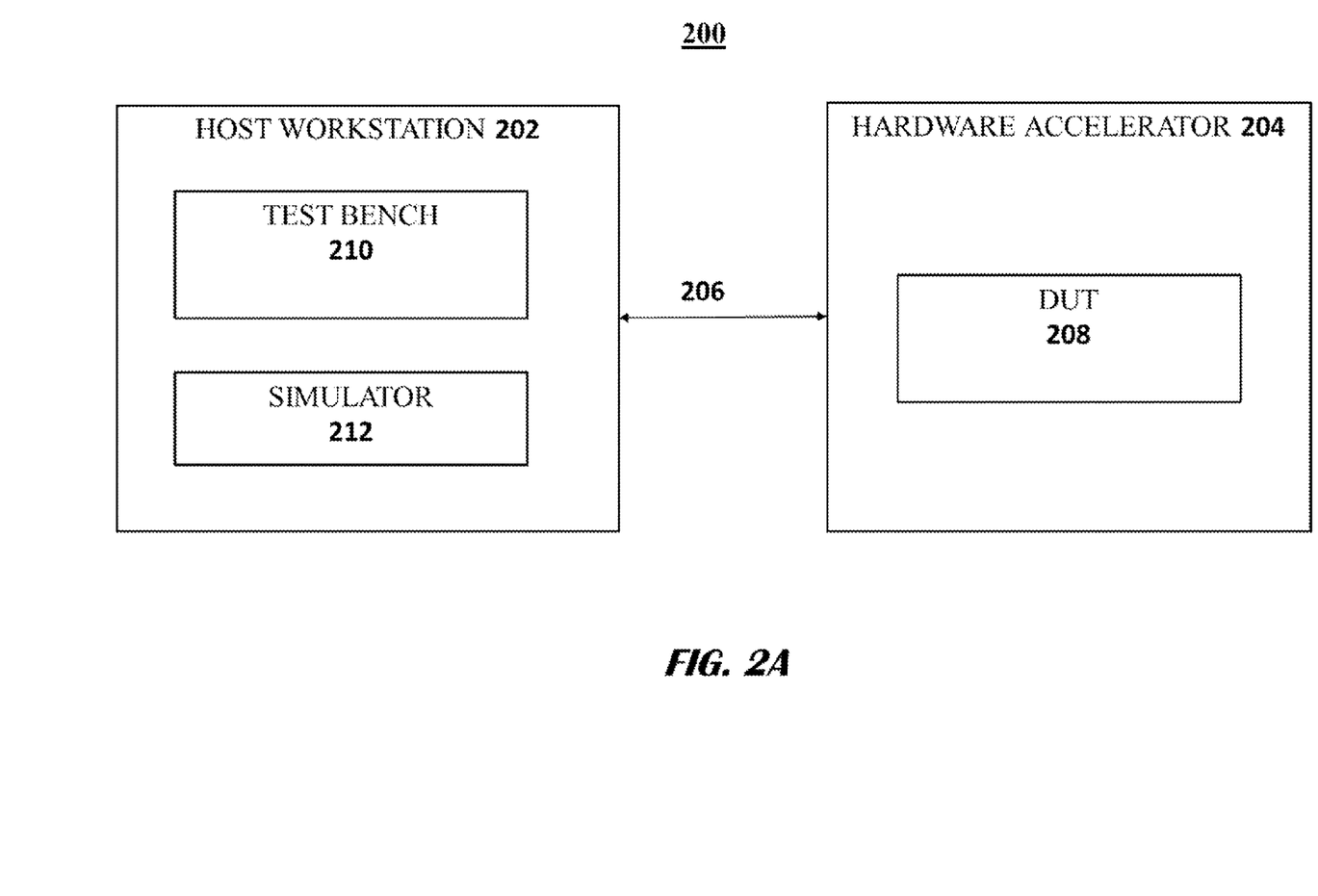
FIG. 2A is a block diagram of an illustrative emulation system.

FIG. 2A illustrates a block diagram of an illustrative emulation system 200.

In electronic design automation, a task of functional verification can verify that a logic design conforms to its specification before a logic design is manufactured as integrated circuits (ICs). In order to perform the verification process, a test design is established on the logic design (hereinafter referred to as a "test bench"). The functional verification is performed using an emulation process where the logic design is mapped into an accelerator to provide a design under test (DUT), and the test bench is executed by a simulator on a computer or a host workstation. The emulation process allow the logic design to run much faster on the computer or the host workstation. In one embodiment, a transaction-based acceleration methodology is employed where the test bench runs on a software simulator and communicates with the DUT on a hardware accelerator. The test bench may communicate to the DUT through an abstraction bridge. The abstraction bridge facilitates the exchange of messages between the test bench running on the simulator and the DUT running on the hardware accelerator. The exchange of messages may also be facilitated using a transactor which may compose a series of clocked events from the DUT running on the hardware accelerator into a single message for the test bench running on the simulator.

As illustrated, the emulation system 200 includes the host workstation 202 and the hardware accelerator 204. The host workstation 202 is coupled to the hardware accelerator 204 via a communication link 206. In an embodiment, the host workstation 202 may include any type of a general purpose computer or a specific purpose computer. The hardware accelerator 204 may include any type of acceleration or emulation platform. The hardware accelerator 204 is configured with the DUT 208. The communication link 206 includes any type of high-speed bus for the transfer of signals between the host workstation 202 and the hardware accelerator 204. The host workstation 202 is loaded with the test bench 210. The test bench 210 is configured to perform tests on the DUT 208 for functionally verifying the logic design of the DUT 208. The test bench 210 defines a verification environment having one or more software models configured to communicate with one or more hardware models. In one embodiment, the one or more software models may be written using a programming language, such as C/C++, SystemC, or SystemVerilog, and are compiled for execution by the simulator 212. Further, the one or more software models may comprise various test algorithms and routines for functional verification. The one or more hardware models may be specified using a synthesizable language, for example, an HDL or synthesizable SystemC, and are compiled into a form suitable for execution by the hardware accelerator 204. The test bench 210 may further include one or more processes that call a task in order to communicate with the logic design.

Figure 2B:
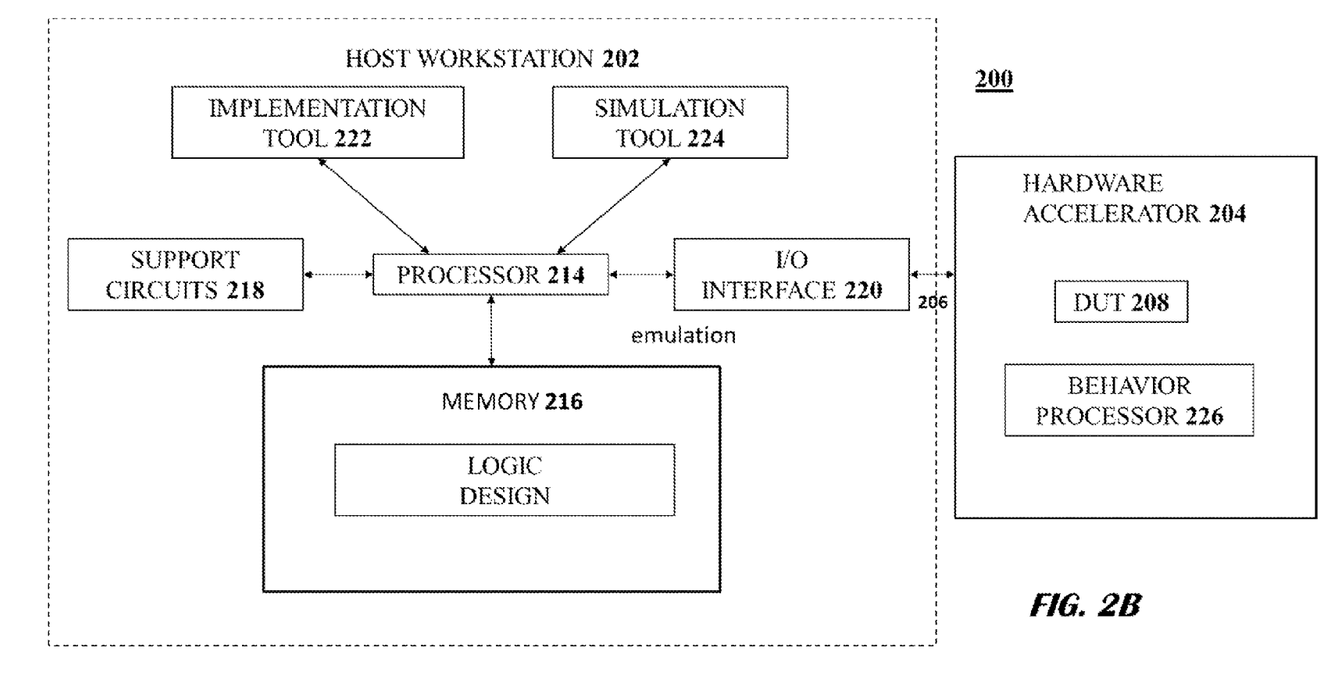
FIG. 2B is a block diagram depicting components of an illustrative emulation system.

FIG. 2B is a block diagram depicting components of the emulation system 200. The emulation system 200 includes the host workstation 202 coupled to the hardware accelerator 204 via the communication link 206. The communication link 206 comprises any type of bus or link for the transfer of data between the host workstation 202 and the hardware accelerator 204. The host workstation 202 may include a processor 214, a memory 216, various support circuits 218, and an I/O interface 220.

The processor 214 includes suitable logic, circuitry, and interfaces that are operable to execute one or more instructions to perform predetermined operations/tasks. The processor 214 can be realized through a number of processor technologies known in the art. The examples of the processor 214 include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. In an embodiment, the processor 214 includes a Graphics Processing Unit (GPU) that executes the set of instructions to perform one or more processing operations.

The memory 216 stores a set of instructions, the logic design, tasks, and the data. Some of the commonly known memory 216 implementations include, but are not limited to, a random access memory (RAM), a read only memory (ROM), a hard disk drive (HDD), a secure digital (SD) card, a magneto-resistive read/write memory, an optical read/write memory, a cache memory, or a magnetic read/write memory. Further, the memory 216 includes the one or more instructions that are executable by the processor 214 to perform specific operations. It is apparent to a person having ordinary skills in the art that the one or more instructions stored in the memory 214 enable the hardware of the emulation system 200 to perform the predetermined operations/tasks. The support circuits 218 for the processor 214 include conventional cache, power supplies, clock circuits, data registers, I/O interfaces, and the like. The I/O interface 220 may be directly coupled to the memory 216 or coupled through the processor 214. The I/O interface 220 may also be configured to communicate with the hardware accelerator 204 via the communication link 206.

The host workstation 202 may be loaded with an implementation tool 222 and a simulation tool 224. The implementation tool 222 is configured to translate a hardware description of the logic design into a gate-level description, which is then translated into a physical description that can be loaded into the hardware accelerator 204 as DUT 208. The gate-level description produced by the implementation tool 222 may include a register transfer level (RTL) netlist or the like. In an embodiment, the DUT 208 for emulation is usually provided in the form of register transfer level (RTL) description or gate-level netlists. The physical description produced by the implementation tool 222 may comprise a bitstream. The simulation tool 224 is configured to compile and execute a test bench 210. The test bench 210 is configured to execute one or more verification processes on the DUT 208 for functionally verifying the logic design. The logic design and test bench 210 may be specified using a hardware modeling language, such as hardware description languages (HDLs) (e.g., VHDL or Verilog) or higher-level languages, such as SystemC, System Verilog, and the like, or programming languages, such as C, C++, and the like. In some cases, the logic design may include behavioral portions that are not directly synthesizable. Such behavioral portions of the logic design can be modeled in software, for example, compiled and executed via the simulation tool. Likewise, the test bench 210 may include synthesizable portions capable of being modeled in hardware. Such synthesizable portions of the test bench 210 may be synthesized and implemented in the hardware accelerator 204. The term "tool" of the implementation tool 222 and the simulation tool 224 as used herein is meant to encompass software implementations, hardware implementations, or a combination of hardware and software implementations.

The host workstation 202 may further include a task stub (not shown), one or more run-time controllers (not shown), and a RPC channel memory (not shown). The one or more run-time controllers or the task stub may be separate elements in the host workstation 202 or may be part of the simulation tool 224. The RPC channel memory may be implemented in the memory 216. For example, the RPC channel memory may be an address space in the memory 216 maintained by the simulation tool 224. The run-time controller is configured to provide an input signal to a task server (not shown), and receive an output signal from the task server. In the simulation tool 224, the task stub is configured to manage remote procedure calls for communicating with the task server. The task stub is defined to be an automatic and time consuming process. The simulation tool 224 may manage threading for the task stub.

The hardware accelerator 204 is a programmable device used in the verification of hardware design. The hardware accelerator 204 allow to test and verify the operation of an integrated circuit, an entire board of integrated circuits, or an entire system without having to first physically fabricate the hardware. The hardware accelerator 204 may comprise a computer for providing acceleration/emulation support facilities, that is, emulation software, a compiler, and a graphical user interface to allow a person to program the hardware accelerator 204.

In an embodiment, the compiler may be a software module, which may be executed by the computer workstation or host workstation 202, and is configured to receive and compile a netlist design file containing the logical gate design of an IC, and then to generate a virtual logic file based on the compiled netlist. The compiler "maps" the IC's logic and timing of operations into the hardware components of the emulation system 200 to generate instructions for the components of the emulation system 200 to cause the emulation system 200 to function as the IC would function. The compiler module may include a partitioner and scheduler component or function, though it should be appreciated that the compiler may be segmented into any number of component software modules. In an opening import phase, the compiler receives the netlist and begins compiling. Here, the compiler may parse the logic gates of the netlist into a database format. A partitioner may determine which part of the netlist is going to be executed by which type of hardware resource of the emulation system 200. Then, a scheduler may determine for that part of the netlist which of the hardware resources should execute the part of the netlist and when in the execution lifecycle the netlist should be executed. The compiler may be capable of determining the status of components of the emulation system 200, including the allocation status or whether the netlist is broken (i.e., marked-out).

In an embodiment, the emulation software may be a software module, which may be executed by the computer workstation or host workstation 202, and is configured to track the status and control the performed of components of the emulation system 200. The emulation software may determine which components of the emulation system 200 are available or unavailable to receive parts of the virtual logic generated by the compiler. In some cases, the emulation software continuously polls or self-tests the emulation system 200 for faulty hardware components. In some cases, the emulation software may determine the status of components of the emulation system 200 when the virtual logic is being loaded into the hardware components of the emulation system 200. In some embodiments, the emulation software may determine whether the instructions of the virtual logic should be revised from the instructions that were originally compiled. The emulation software may be configured to automatically make this determined, or may receive instructions from an administrator through a GUI to review and revise the complied instructions. In some cases, these software modules may be executed in whole or in part on a computer workstation, such as an administrator or user computer, which may communicate data and instructions associated with the respective software module to and from the host workstation 202. It should be appreciated that the computer workstation may be any computing device including a processor and non-transitory machine-readable storage that render the computer workstation capable of performing the various tasks and processes described herein. The non-limiting examples of computer workstation may include laptops, tablets, server computers, or the like.

The hardware accelerator 204 may further comprise an emulation engine for performing the emulation. The emulation engine forms a core element of the hardware accelerator 204. The emulation engine generally comprises an emulation board. The emulation board comprises emulation circuits. The emulation circuit comprises several emulation processors. The emulation processor is capable of mimicking a logic gate. The hardware accelerator 204 may further comprise any type of emulation platform. For example, the hardware accelerator 204 may include one or more programmable logic devices (PLDs), such as field programmable gate arrays (FPGAs) to perform the emulation. In one embodiment, the FPGA may be incorporated within or mounted on an expansion board, for example, a personal computer expansion board such as a Peripheral Component Interconnect (PCI) board. In another embodiment, the multiple expansion boards may be included in the hardware accelerator 204. The one or more FPGAs may be mounted on each expansion board of the multiple expansion boards.

In one example, the emulation system 200 may include a rack. The rack may be any physical housing for components of the emulation system 200. The rack houses a plurality of emulation logic boards that are organized into board clusters. In some cases, the rack may be a computing device, such as a server computer or workstation computer, configured to implement various emulation functions. The rack may physically house components of any type, such as board clusters, emulation logic boards, emulation chips, and buses hosting data signal communications. The board clusters may be logical and/or physical collectives of one or more logic boards. The logic boards may be clustered for any number of reasons, such as creating proximity among a set of boards for more efficient signal transfer and processing between the boards of the cluster. It should be appreciated that clustering logic boards is often a design consideration, and, as such, other embodiments may cluster and/or disaggregate logic boards according to any number of different organizational patterns. The board clusters may be interconnected with one another by buses that may carry data signals transmitted to and from the board clusters. The buses may interconnect the logic boards of a particular board cluster, so that the logic boards may transmit and receive data signals to and from other logic boards within the same board cluster. The emulation logic boards may include computing hardware components capable of emulation functionality to emulate the design and functions of an IC or other circuitry. The logic board may comprise one or more emulation chips performing the functions used for emulation, and one or more buses interconnecting the emulation chips. The buses may be an optical, copper, or any other conductive material capable of carrying data signals. In operation, the buses may carry data signals transmitted to and from the emulation chips of the logic board. In some cases, the logic board may include one or more buses supporting communication between emulation chips on the same logic board and, in some cases, the logic board may include one or more buses supporting communication between emulation chips located on other logic boards of the emulation system 200.

In the present disclosure, the hardware accelerator 204 include any number of processors capable of performing the various tasks and processes for emulating an IC or other logical processing circuitry, multiplexers configured to direct data signals to and from the processors, buses for communicating data between the processors, and data lanes connecting the components of a processor. The hardware accelerator 204 may be designed to mimic the functionality of any IC design, based on programmable logic that configures the behavior of the emulator chips to mimic the particular IC. In this way, circuitry designers may prototype new IC designs using processor-based emulation, before actually manufacturing the IC and host device. The hardware accelerator 204 may receive a set of instructions to execute from a compiler, which may be a software module component executed by a computing device. In operation, the compiler compiles a netlist file representing the IC's design. The result of compiling the netlist generates virtual logic comprising instruction sets for the components (e.g., multiplexers) of the hardware accelerator 204. In some embodiments, the processors of the hardware accelerator 204 may be organized into any number of processor clusters to efficiently share data inputs, data outputs, and data references. For example, multiple processors of the hardware accelerator 204 may be clustered together such that the processors reference the same data array and/or instruction store. As understood in the art, the hardware accelerator 204 operate on clock cycles that enable each of the hardware accelerators 204 to be synchronized. Certain aspects of the hardware accelerator 204 enable communications between the hardware accelerators 204 between the clock cycles to provide for delays, testing, and debugging, and other features.

The emulation system 200 may further comprise an instructional database (not shown) and a resource index database (not shown). The instruction database may store records of virtual logic or instruction sets compiled by the compiler from netlist files. The instruction database may be hosted in non-transitory machine-readable storage medium of any computing device capable of hosting the instruction database and performing the various tasks and processes associated with the instruction database, as described herein. The instruction database may receive, from a device executing the compiler, instructions compiled from the netlist file of an IC. In some cases, the instructions may contained within a virtual logic file generated by the compiler. At download time, when the hardware components of the emulation system 200 are loaded with the instructions, the instruction database may transmit or provide the instructions to the components, and the instruction sets are loaded into the memories of the respective hardware components within the emulation logic boards. The resource index database may be a database or a machine-readable computer file (e.g., marked-out list) containing records for components of the emulation system 200. The resource index database or similar resource may be hosted in non-transitory machine-readable storage medium of any computing device capable of hosting the resource index database and performing the associated tasks and processes described herein. The records may indicate various types of status information about components, such as allocation status, availability status (e.g., busy, broken, incompatible), execution status (e.g., busy, idle), and the like. The resource index database may be periodically updated by modules of the emulation system 200.

The hardware accelerator 204 of the emulation system 200 may further include a behavior processor 226. The finite state machine (FSM) implementation of the task server meets the behavior processor 226 requirements and can be directly compiled into the behavior processor 226. The behavior processor 226 provides an architecture for implementing behavioral aspects of the logic design, for example, HDL code that is not directly synthesizable.

Figure 3:
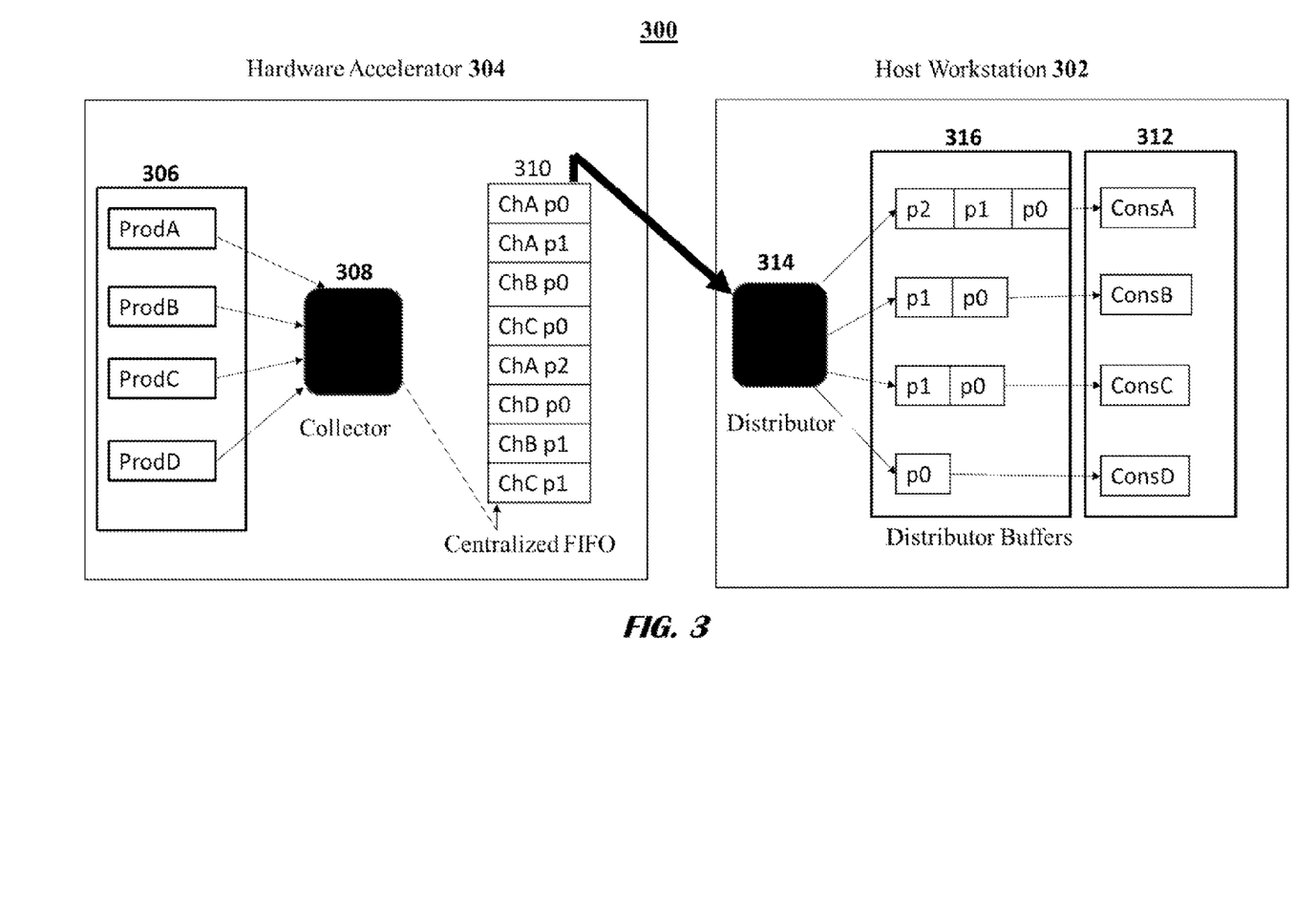
FIG. 3 is a block diagram depicting streaming of data between a producer unit and a consumer unit in an emulation system.

FIG. 3 is a block diagram depicting streaming of data between a first device and a second device in an emulation system 300. As illustrated in FIG. 3, the emulation system 300 comprises a host workstation 302 and a hardware accelerator 304. The host workstation 302 and the hardware accelerator 304 comprises all the features and functions of the host workstation 202 and hardware accelerator 204 described in FIGS. 2A and 2B. In the instant embodiment, the hardware accelerator 304 comprises the first device. The first device comprises a processor. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The first device comprises a producer unit 306. The producer unit 306 comprises one or more producers. In one example, the one or more producers comprises four producers. The four producers are depicted as ProdA, ProdB, ProdC, and ProdD in FIG. 3. The hardware accelerator 304 further comprises of a collector unit 308 and a centralized first-in first-out (FIFO) memory unit 310. The collector unit 308 is positioned between the producer unit 306 and the centralized FIFO memory unit 310. In the instant embodiment, the host workstation 302 comprises the second device. The second device comprises a processor. The examples of the processor include, but are not limited to, an x86 processor, an ARM processor, a Reduced Instruction Set Computing (RISC) processor, an Application-Specific Integrated Circuit (ASIC) processor, or a Complex Instruction Set Computing (CISC) processor. The second device comprises a consumer unit 312. The consumer unit 312 comprises one or more consumers. In one example, the one or more consumers comprises four consumers. The four consumers are depicted as ConsA, ConsB, ConsC, and ConsC in FIG. 3. The host workstation 302 further comprises a distributor unit 314 and one or more distributor buffers 316. The one or more distributor buffers 316 are positioned between the distributor unit 314 and the consumer unit 312.

The one or more producers are configured to produce machine readable binary data comprising one or more channel packets for the corresponding one or more consumers. In one embodiment, the channel packet correspond to data. The channel packets produced by each of the one or more producers are sent to the collector unit 308. The collector unit 308 is configured to receive the channel packets as an input by the producer unit 306, and send the channel packets as an output to the centralized FIFO memory unit 310. The centralized FIFO memory unit 310 is configured to receive all the channel packets produced by the one or more producers for delivering it to the host workstation 302 comprising the one or more consumers. Each of the channel packets received by the centralized FIFO memory unit 310 comprises at least a channel number. The centralized FIFO memory unit 310 is configured to transmit the channel packets to the distributor unit 314 of the host workstation 302. The channel packets are sent to the distributor unit 314 from the centralized FIFO memory unit 310 when there is a request for synchronization by the one or more producers, or the one or more consumers. The synchronization generally occurs when the centralized FIFO memory unit 310 is full. The collector unit 308 is configured to determine whether the centralized FIFO memory unit 310 is full or not. In one embodiment, the one or more producers may request the synchronization when the centralized FIFO memory unit 310 is full because the one or more producers are configured to produce only when there is space to store the channel packets in the centralized FIFO memory unit 310. Therefore, the one or more consumers need to consume the channel packets in the centralized FIFO memory unit 310 in order to allow the one or more producers to produce more channel packets. In another embodiment, the one or more consumers may request for the synchronization even when the centralized FIFO memory unit 310 is not full. The distributor unit 314 is configured to send the channel packets to the one or more distributed buffers 316. The distributor unit 314 distributes the channel packets among the one or more distributed buffers 316 based on the channel number associated with the channel packets. In one example, the distributor unit 314 receives the channel packets from the centralized FIFO memory unit 310 for all of the one or more consumers. The distributor unit 314 will then analyze the channel number associated with each of the channel packets and distribute the channel packets having a same channel number to one of the one or more distributed buffers 316. In other words, each distributor buffer of the one or more distributor buffers 316 will received channel packets having a same channel number. Each of the one or more distributor buffers 316 then transmits the channel packets to the corresponding one or more consumers of the consumer unit 312.

Figure 4:
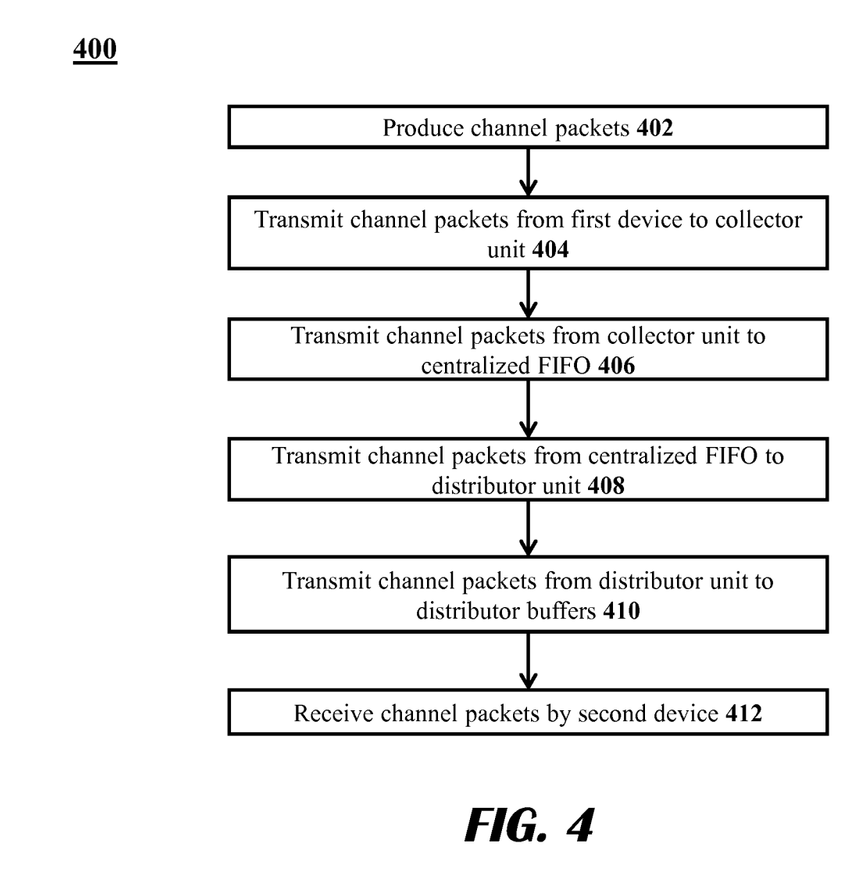
FIG. 4 is a flow diagram depicting a method of streaming of data between a producer unit and a consumer unit in an emulation system.

FIG. 4 is a flow diagram depicting streaming of data between a producer unit and a consumer unit in an emulation system.

At step 402, the processor receives the one or more channel packets from the first device. The first device comprises the producer unit. In an embodiment, the processor unit includes the one or more producers. The one or more producers are configured to produce one or more channel packets. Each of the one or more producers produces the channel packets for its corresponding consumer of the one or more consumers in the consumer unit. The second device comprises the consumer unit. In one example, the one or more producers comprises four producers. The four producers are namely ProdA, ProdB, ProdC, and ProdD. The one or more consumers comprises four consumers. The four consumers are namely ConsA, ConsB, ConsC, and ConsC. In this example, the ProdA will produce the data for ConsA, the ProdB will produce the data for ConsB, and so on.

At step 404, the processor transmits the one or more channel packets from the one or more producers to the collector unit. The channel packets produced by each of the one or more producers are transmitted to the collector unit. The collector unit is configured to receive the channel packets as an input by the producer unit, and send the channel packets as an output to the centralized FIFO memory unit. In one example, the channel packets produced by each of the one or more producers comprises eight channel packets. The eight channel packets are ChA p0, ChA p1, ChB p1, ChC p0, ChA p2, ChD p0, ChB p1, and ChC p1. Herein, the ChA corresponds to the data produced by producer A (ProdA) for Consumer A (ConsA). The ChB corresponds to the data produced by producer B (ProdB) for Consumer B (ConsB). The ChC corresponds to the data produced by producer C (ProdC) for Consumer C (ConsC). The ChD corresponds to the data produced by producer D (ProdD) for Consumer D (ConsD). Herein, p0 represents first data, p1 represents second data, and so on.

At step 406, the processor transmits the one or more channel packets from the collector unit to the centralized FIFO memory unit. The centralized FIFO memory unit is configured to receive all the channel packets produced by the one or more producers for delivering it to the host workstation comprising the one or more consumers. Each of the channel packets received by the centralized FIFO memory unit comprises at least a channel number associated with it.

At step 408, the processor transmits the one or more channel packets from the centralized FIFO memory unit to the distributor unit. The centralized FIFO memory unit is configured to transmit the channel packets to the distributor unit of the host workstation. The channel packets are sent to the distributor unit from the centralized FIFO memory unit when there is a request for synchronization by the one or more producers, or the one or more consumers. The synchronization generally occurs when the centralized FIFO memory unit is full. The collector unit is configured to determine whether the centralized FIFO memory unit is full or not. In one embodiment, the one or more producers may request the synchronization when the centralized FIFO memory unit is full because the one or more producers are configured to produce only when there is space to store the channel packets in the centralized FIFO memory unit. Therefore, the one or more consumers need to consume the channel packets in the centralized FIFO memory unit in order to allow the one or more producers to produce more channel packets. In another embodiment, the one or more consumers may request for the synchronization even when the centralized FIFO memory unit is not full.

At step 410, the processor transmits the one or more channel packets from the distributor unit to the one or more distributor buffers. The distributor unit is configured to send the channel packets to the one or more distributed buffers. The distributor unit distributes the channel packets among the one or more distributed buffers based on the channel number associated with the channel packets. In one example, the distributor unit receives the channel packets from the centralized FIFO memory unit for all of the one or more consumers. The distributor unit will then analyze the channel number associated with each of the channel packets and distribute the channel packets having a same channel number to one of the one or more distributed buffers. In other words, each distributor buffer of the one or more distributor buffers will received channel packets having a same channel number. In one example, there are four distributor buffers. The first distributor buffer corresponds to a first consumer (Cons A), the second distributor buffer corresponds to a second consumer (Cons B), the third distributor buffer corresponds to a third consumer (Cons C), and the fourth distributor buffer corresponds to a fourth consumer (Cons D). Herein, the first distributor buffer is configured to receive the data ChA. The second distributor buffer is configured to receive the data ChB. The third distributor buffer is configured to receive the data ChC. The fourth distributor buffer is configured to receive the data ChD.

At step 412, the processor transmits the channel packets from each of the one or more distributor buffers to the corresponding one or more consumers of the consumer unit.

The foregoing method descriptions and the process flow diagrams are provided merely as illustrative examples and are not intended to require or imply that the steps of the various embodiments must be performed in the order presented. The steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

While various aspects and embodiments have been disclosed, other aspects and embodiments are contemplated. The various aspects and embodiments disclosed are for purposes of illustration and are not intended to be limiting, with the true scope and spirit being indicated by the following claims.

What is claimed is:

1. An emulation system comprising:
   a first device comprising a processor executing one or more emulation modules configured to:
   produce one or more channel packets comprising machine readable binary data wherein each of the one or more channel packets includes a channel number;
   generate a transfer request upon receiving an indication that a centralized first-in first-out (FIFO) memory unit is full, wherein the centralized first-in first-out (FIFO) memory unit is communicatively coupled to the first device and a second device and comprises non-transitory machine-readable storage media configured to sequentially store the one or more channel packets according to an ordering of the one or more packets received from the first device; and
   a distributor comprising a processor configured to sequentially transmit the one or more channel packets to the second device from the centralized FIFO memory unit upon receiving the transfer request from the first device or a transfer request from the first device or the second device; and one or more distributor buffers each configured to receive the one or more channel packets having a common channel number from the centralized FIFO memory unit, wherein each of the one or more distributor buffers are further configured to transmit the one or more channel packets to corresponding consumer units of the second device.

2. The emulation system of claim 1, wherein the processor of the first device is further configured to execute a producer unit comprising one or more producers generating the one or more channel packets.

3. The emulation system of claim 2, wherein the second device comprises a processor configured to execute a consumer unit comprising one or more consumer modules associated with the one or more channel packets based on the channel number associating a respective producer unit with a respective consumer unit.

4. The emulation system of claim 1, wherein the first device and the centralized FIFO memory unit represents a hardware side of the emulation system.

5. The emulation system of claim 1, further comprising a collector unit positioned between the first device and the centralized FIFO memory unit.

6. The emulation system of claim 5, wherein the collector unit is configured to collect the one or more channel packets from the first device and transmit the one more channel packets to the centralized FIFO memory unit.

7. The emulation system of claim 1, wherein the distributor is configured to receive the one or more channel packets from the centralized FIFO memory unit, and transmit the one or more channel packets to the second device.

8. The emulation system of claim 5, wherein the centralized FIFO memory unit requires a single PC latency to retrieve the one or more channel packets from the collector unit.

9. The emulation system of claim 5, wherein the collector unit is further configured to determine if the centralized FIFO memory unit is empty or full.

10. The emulation system of claim 7, wherein the one or more distributor buffer units are positioned between the distributor and the second device.

11. A processor-implemented method comprising:
receiving, by a processor of an emulation system, one or more channel packets from a first device of the emulation system, the first device executing one or more emulation modules configured to generate the one or more channel packets, each of the one or more channel packets comprising machine-readable binary data and a channel number;
sequentially storing, by the processor, the one or more channel packets in a centralized first-in first-out (FIFO) memory unit comprising non-transitory machine-readable storage media configured to store the one or more channel packets; and
sequentially transmitting, by the processor, the one or more channel packets from the centralized FIFO memory unit to a second device via one or more distributor buffers, upon receiving a transfer request from the first device or the second device, wherein the first device is configured to generate the transfer request upon receiving an indication that the centralized FIFO memory unit is full, and wherein each of the one or more distributor buffers is configured to receive the one or more channel packets having a common channel number from the centralized FIFO memory unit upon execution of the transfer request, and wherein each of the one or more distributor buffers are configured to transmit the one or more channel packets to corresponding consumer units of the second device.

12. The processor-implemented method of claim 11, wherein the first device comprises a processor executing a producer unit module comprising one or more producers, a producer configured to generate a channel packet of the one or more channel packets, and wherein the second device comprises a processor executing a consumer unit module comprising one or more consumers, a consumer configured to receive the channel packet from the centralized FIFO based upon the channel associated with the producer that generated the channel packet.

13. The processor-implemented method of claim 11, the centralized FIFO memory unit further comprising a collector unit communicatively coupled to the first device and the centralized FIFO memory unit.

14. The processor-implemented method of claim 13, wherein the collector unit is configured to receive the one or more channel packets from the first device and transmit the one more channel packets to the centralized FIFO memory unit.

15. The processor-implemented method of claim 11, wherein a distributor unit is configured to receive the one or more channel packets from the centralized FIFO memory unit, and transmit the one or more channel packets to the second device.

16. The processor-implemented method of claim 13, wherein the centralized FIFO memory unit requires a single PC latency to retrieve the one or more channel packets from the collector unit.

17. The processor-implemented method of claim 13, wherein the collector unit is further configured to determine if the centralized FIFO memory unit is empty or full.

18. The processor-implemented method of claim 11, wherein the emulation system comprising a hardware accelerator device, and wherein the hardware accelerator comprises the first device and the centralized FIFO memory unit.

19. The processor-implemented method of claim 11, wherein the emulation system comprises a host workstation, and wherein the host workstation comprises the second device, and the one or more distributor buffers.

* * * * *